US011870363B2

United States Patent
Virunjipuram Murugesan et al.

(10) Patent No.: US 11,870,363 B2
(45) Date of Patent: Jan. 9, 2024

(54) HIGH-SPEED, ACCURATE PEAK AND VALLEY SENSING FOR SECONDARY-CONTROLLED FLYBACK CONVERTER

(71) Applicant: Cypress Semiconductor Corporation, San Jose, CA (US)

(72) Inventors: Saravanan Virunjipuram Murugesan, Bangalore (IN); Rajesh Karri, Visakhapatnam (IN); Arun Khamesra, Bangalore (IN); Hariom Rai, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 128 days.

(21) Appl. No.: 17/576,776

(22) Filed: Jan. 14, 2022

(65) Prior Publication Data

US 2023/0231483 A1    Jul. 20, 2023

(51) Int. Cl.
*H02M 3/335* (2006.01)
*H02M 1/00* (2006.01)

(52) U.S. Cl.
CPC ...... *H02M 3/33592* (2013.01); *H02M 1/0058* (2021.05); *H02M 3/33523* (2013.01)

(58) Field of Classification Search
CPC .. H02M 1/0058; H02M 3/01; H02M 3/33507; H02M 3/33523; H02M 3/33576; H02M 3/33592
See application file for complete search history.

(56) References Cited

U.S. PATENT DOCUMENTS

| 2012/0249112 | A1* | 10/2012 | Langeslag | ........... | H02M 3/1563 323/311 |
| 2015/0280584 | A1* | 10/2015 | Gong | ................ | H02M 3/33515 363/21.13 |
| 2015/0303816 | A1* | 10/2015 | Tumminaro | ............ | H02M 1/08 363/21.04 |
| 2020/0412265 | A1* | 12/2020 | Murugesan | ....... | H02M 3/33523 |

* cited by examiner

*Primary Examiner* — Fred E Finch, III

(57) ABSTRACT

A secondary side controller for a flyback converter includes an integrated circuit (IC), which in turn includes: a synchronous rectifier (SR) sense pin coupled to a drain of an SR transistor on a secondary side of the flyback converter; a capacitor having a first side coupled to the SR sense pin, the capacitor to charge or discharge responsive to a voltage sensed at the SR sense pin; a diode-connected transistor coupled between a second side of the capacitor and ground; a first current mirror coupled to the diode-connected transistor and configured to receive, as input current, a reference current from a variable current source; and a peak detect transistor coupled to the diode-connected transistor and to an output of the first current mirror. The peak detect transistor is to output a peak detection signal in response to detecting current from the capacitor drop below the reference current.

20 Claims, 10 Drawing Sheets

HIGH-SPEED, ACCURATE PEAK AND VALLEY SENSING FOR SECONDARY-CONTROLLED FLYBACK CONVERTER

TECHNICAL FIELD

This disclosure relates to integrated circuits (ICs) that control Universal Serial Bus (USB) power delivery to electronic devices.

BACKGROUND

Various electronic devices (e.g., such as smartphones, tablets, notebook computers, laptop computers, chargers, adapters, power banks, etc.) are configured to transfer power through USB connectors according to USB power delivery protocols defined in various versions and revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. In various applications, electronic manufacturers may also use power converters (e.g., such as an alternating-current/direct current (AC-DC) flyback converter) to do USB-PD from the AC mains supply. The efficiency of such converters has become increasingly important. This requires precision control of the primary and secondary power transistors despite sinusoidal oscillations (e.g., ringing) in the sinusoidal waveform on the secondary side of a transformer.

DETAILED DESCRIPTION

Figure 1A:
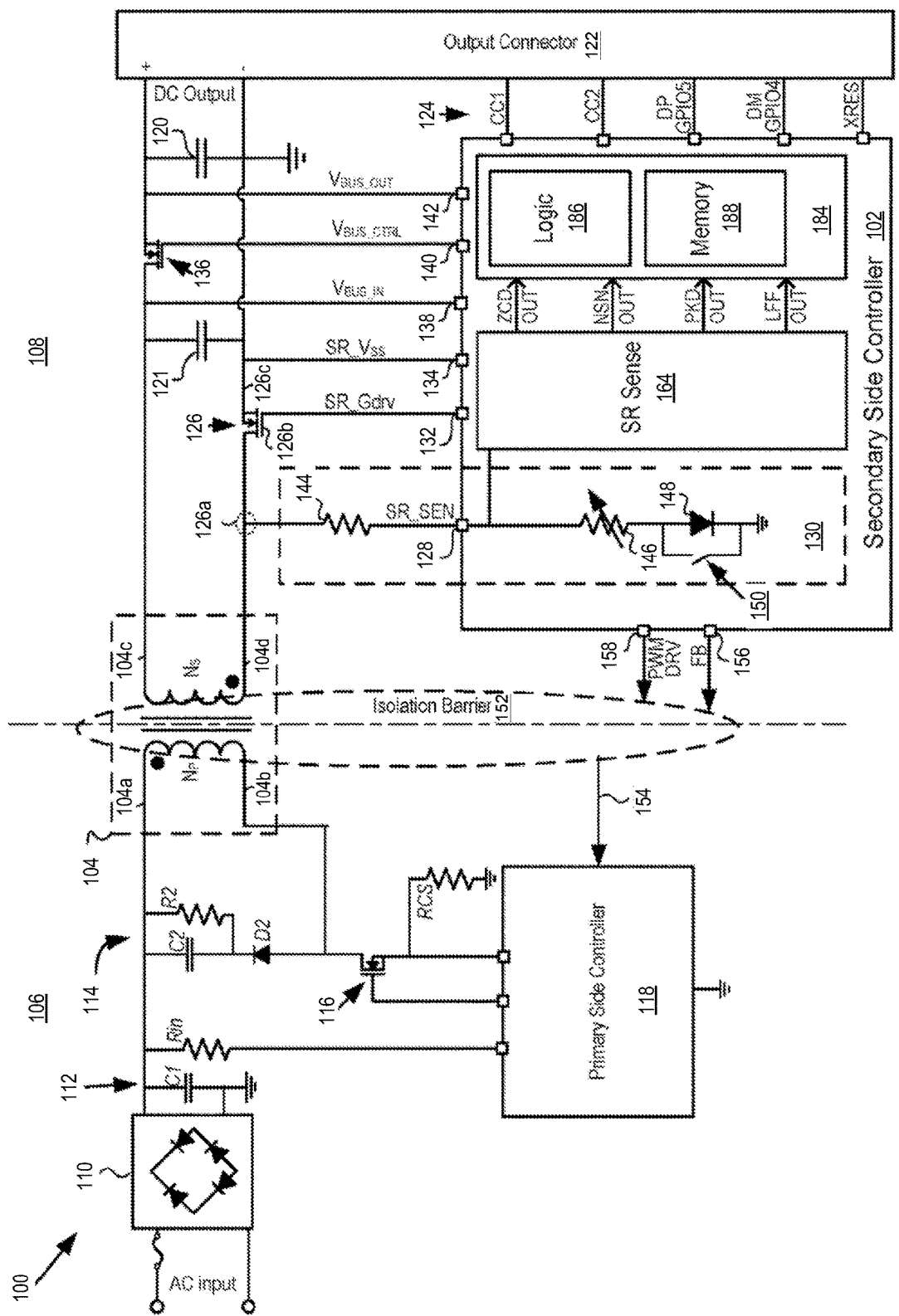
FIG. 1A is a schematic block diagram depicting an embodiment of an AC-DC converter including a secondary side controller and synchronous flyback architecture to generate power switch (PS) signals to improve efficiency in accordance with some embodiments.

The following description sets forth numerous specific details such as examples of specific systems, components, methods, and so forth, in order to provide a good understanding of various embodiments of an AC-DC flyback converter for USB Type-C controllers described herein. It will be apparent to one skilled in the art, however, that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of an AC-DC flyback converter in USB Type-C controllers that can be disposed to operate in various electronic devices. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., cables, hubs, docking stations, adapters, chargers, etc.), audio/video/data recording and/or playback devices (e.g., cameras, voice recorders, hand-held scanners, monitors, etc.), and other similar electronic devices that can use USB interfaces for communication, battery charging, and/or power delivery.

As used herein, "USB-enabled" device or system refers to a device or system that includes, is configured with, or is otherwise associated with a USB connector interface. A USB-enabled electronic device may comply with at least one release of a Universal Serial Bus (USB) specification. Examples of such USB specifications include, without limitation, the USB Specification Revision 2.0, the USB 3.0

Specification, the USB 3.1 Specification, the USB 3.2 Specification and/or various supplements, versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C (also referred to herein as "USB-C"), is defined in various releases and/or versions of the USB Type-C specification. The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (or communication channel, denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification. The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc. As used herein, "USB-PD subsystem" refers to one or more logic blocks and other analog/digital hardware circuitry, which may be controllable by firmware in an IC controller and which is configured and operable to perform the functions and to satisfy the requirements specified in at least one release of the USB-PD specification. The IC controller can be implemented in a USB Type-C device. The IC controller can be implemented in a USB device.

Power delivery in accordance with the USB-PD specification(s) can be embodied in several different types of USB Type-C applications. Examples of such types of Type-C applications include, but may not be limited to: a downstream facing port (DFP) application, in which an IC controller with a USB-PD subsystem is configured to provide a downstream-facing USB port (e.g., in a USB-enabled host device); an upstream facing port (UFP) application, in which an IC controller with a USB-PD subsystem is configured to provide an upstream-facing USB port (e.g., in a USB-enabled peripheral device or adapter); a dual role port (DRP) USB application, in which an IC controller with a USB-PD subsystem is configured to support both DFP and UFP applications on the same USB port (e.g., a USB Type-C port that is configured to operate as either a power provider or a power consumer or can alternate between these two roles dynamically by using USB-PD power role swap); and an active cable application, in which an IC controller with a USB-PD subsystem is disposed into, and configured to operate, an electronically marked cable assembly (EMCA) Type-C cable.

In some embodiments, AC-DC converters with secondary side control and synchronous rectifier (SR) architecture including a single SR-sense pin (SR_SEN) and methods of operating the same are disclosed for reducing the cost, complexity and size of the converter while improving efficiency. The system and methods of the present disclosure are particularly useful in or with AC-DC flyback converters to improve peak and valley detection for improved control of a primary side switch or primary FET by a secondary side controller to improve efficiency of the AC-DC flyback converter.

Figure 1B:
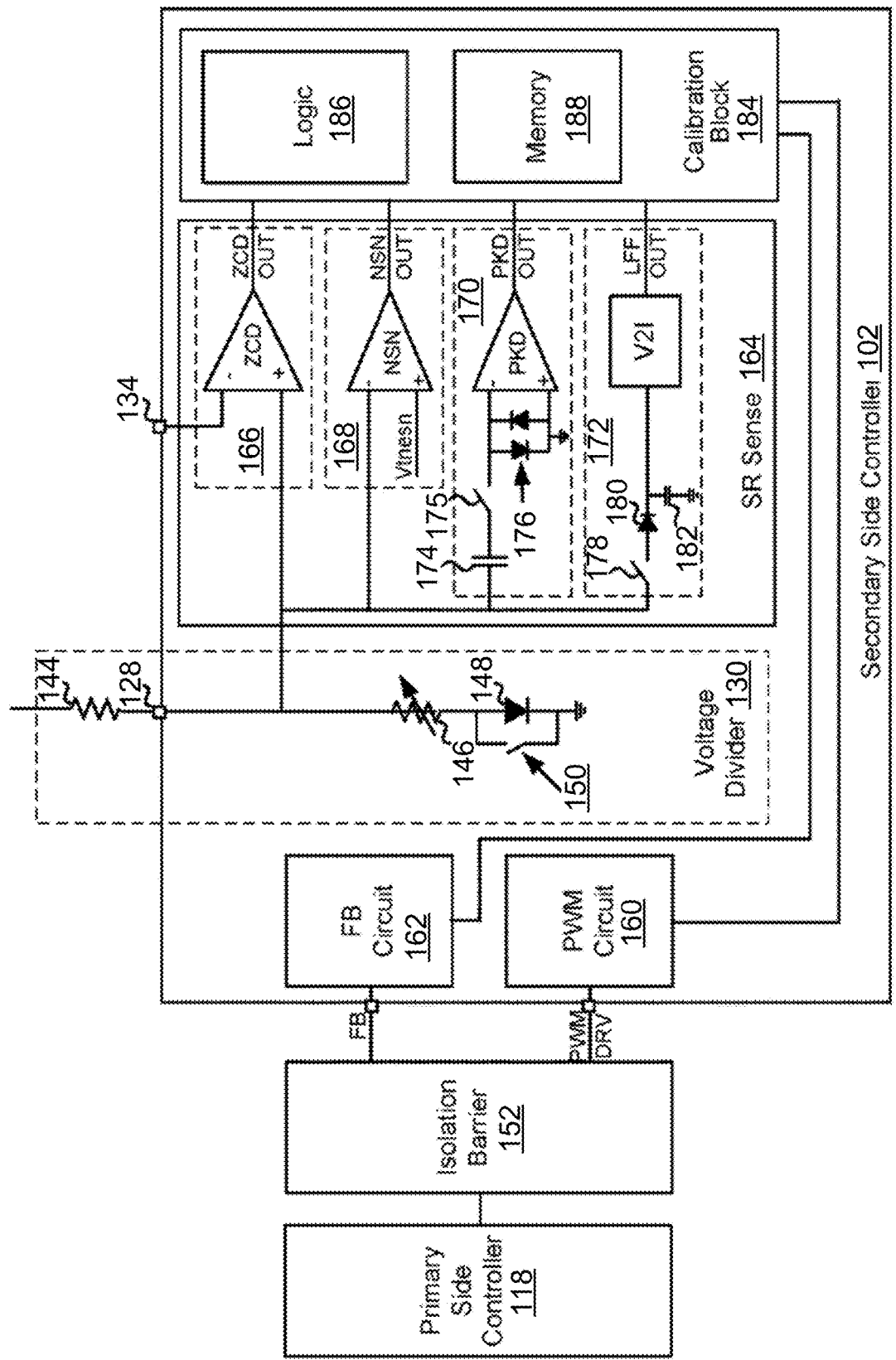
FIG. 1B is a schematic block diagram depicting of a portion of the secondary side controller of FIG. 1A including an embodiment of the calibration block according to some embodiments.

FIG. 1A is a schematic block diagram depicting an embodiment of an AC-DC flyback converter 100 including a secondary side controller 102 and synchronous flyback architecture to generate power switch (PS) signals to improve efficiency in accordance with some embodiments. FIG. 1B is a schematic block diagram depicting a portion of the secondary side controller 102 of FIG. 1A including an embodiment of a calibration block 184 according to some embodiments. In these embodiments, the secondary side controller 102 is configured to generate primary field-effect transistor (FET) or power switch (PS) signals to improve an accuracy of peak and valley detection and thus an efficiency of the flyback converter 100, and method of operating the same.

Referring to FIG. 1A, the flyback converter 100 generally includes a transformer 104 having a primary winding (NP) on a primary side 106 electrically connected or coupled to an AC input, and a secondary winding (NS) on a secondary side 108 coupled to a DC output. On a primary side 106, a rectifying circuit, such as a bridge rectifier 110, and one or more input filters 112, 114, coupled to a first terminal 104a of the transformer 104 rectify an AC input voltage and supply input power to the primary winding of the transformer 104. The input filters can include a first input filter 112 having a capacitor (C1) coupled to or across an output of the bridge rectifier 110, and a second, RC filter 114 including a resistor or resistive element (R2) and a capacitor (C2) coupled in parallel between the first terminal 104a of the transformer 104 and a cathode of a diode or rectifier (D2) having an anode coupled to a second terminal 104b of the transformer.

In some embodiments, the flyback converter 100 further includes a power switch (PS) 116, such as a primary field effect transistor (PR_FET), having a first or drain node coupled to the second terminal 104b of the transformer 104, a second or gate node coupled to a primary side controller 118, and a third or source node coupled to the primary side controller 118 and, through a current sensing element, such as a resistive element (RCS) to ground to sense a primary side current (I_primary) flowing through the primary winding when the PS 116 is closed or conducting. Generally, as in the embodiment shown, the primary side controller 118 is further coupled to the first terminal 104a of the transformer 104 through a resistive element (Rin) to receive a voltage or signal equal or proportional to the rectified AC input voltage.

In these embodiments, a secondary side 108 of the flyback converter 100 includes a filter capacitor 121 coupled between a third terminal 104c of the transformer 104 and an electrical ground or ground terminal, and an output capacitor 120 coupled between a third terminal 104c of the transformer 104 through an additional or secondary switch (SS) 136, such as a provider MOSFET, and an electrical ground or ground terminal to provide a DC output voltage to an output interface or connector 122. In at least some embodiments, the output connector 122 is further coupled to the secondary side controller 102 through a number of communication channels 124 to support various charging protocols. Suitable output connectors 122 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the connector can include a Universal Serial Bus type C (USB-C) compatible connector where the flyback converter 100 is compliant with the USB protocol to provide a DC output voltage of about 3.3 VDC to about 28 VDC at a current of from about 300 to about 5000 milliamps (mA).

In accordance with some embodiments, the secondary side 108 of the flyback converter 100 further includes a synchronous rectifier, such as circuit that includes at least a synchronous rectifier field effect transistor (SR_FET 126), coupled between a fourth terminal 104d of the transformer 104 and the ground terminal of the DC output. The SR_FET 126 includes a first or drain node, e.g., an SR_DRAIN node 126a coupled to the fourth terminal 104d of the transformer 104 and the secondary side controller 102 to sense a voltage on the drain of the SR_FET 126; a second or gate node 126b coupled to the secondary side controller to drive or control the SR_FET 126; and a third or source node 126c coupled to the secondary side controller 102 and the ground terminal of the DC output.

In certain embodiments, the secondary side controller 102 is realized or implemented as a single integrated circuit (IC), or as a number of ICs packaged in a single IC package, and the SR_DRAIN node 126a is coupled to a single SR sense pin 128 (e.g., SR_SEN pin) of the IC through a voltage divider 130 including circuit elements both internal and external to the IC of the secondary side controller. In these embodiments, the gate node 126b of the SR_FET 126 is coupled to the secondary side controller 102 through an SR-drive pin 132, and the source node 126c of the SR_FET 126 is coupled to the secondary side controller through a SR-Vss (negative voltage supply) pin 134.

Optionally, in some embodiments, the secondary side 108 further includes an additional or secondary switch (SS) 136, such as an NFET, coupled between the third terminal 104c of the transformer 104 and a positive DC output to enable to the secondary side controller 102 to turn off the DC output to protect against over voltage and/or under voltage conditions and/or over current conditions and/or short circuit conditions. The SS 136 includes a drain node coupled to a voltage bus in pin ($V_{BUS\_IN}$) 138 of the secondary side controller 102; a gate node coupled to a voltage bus control pin ($V_{BUS\_CTRL}$) 140 to drive or control the SS 136; and a source node coupled to a voltage bus out pin ($V_{BUS\_OUT}$) 142 and to the positive terminal of the DC output.

In at least some embodiments, the voltage divider 130 includes an external resistive element 144, an internal resistive element 146, and an internal rectifier 148. Although shown schematically as a diode, it will be understood that this need not be the case in every embodiment, and that the internal rectifier 148 may be a PN diode (as shown), or alternatively, a synchronous diode or a FET configured or connected to function as a diode. The configuration or placement of the internal rectifier 148, i.e., connected with a cathode to ground, ensures that during negative sensing or zero-crossing operations there is substantially no current flowing through the voltage divider 130, thereby allowing the full, undivided negative voltage on the SR_DRAIN node 126a to be coupled to the SR sense pin 128.

In various embodiments, a resistance value of external resistive element 144 is fixed by the manufacturer of the flyback converter 100 and is selected based on an expected maximum AC voltage input, a turns ratio of the transformer 104 to limit a maximum voltage on the SR_DRAIN node 126a, which is to limit a maximum voltage on the SR sense pin 128, to enable the secondary side controller 102 to be a made with a non-super-high-voltage device technology, e.g., made using standard, much lower voltage technologies. Suitable values for the resistance of the resistive element 144 are from about 4 KΩ to about 101 KΩ. For example, in one embodiment in which the maximum input voltage after bridge rectifier 110 is 380V and the transformer 104 has a 4:1 turns ratio, and the voltage of 21.5V DC on VBUS_IN, the SR_DRAIN node 126a voltage is 116.5V. The secondary side controller 102 can be fabricated using a 20V tolerant technology, and the external resistive element 144 can have a resistance of about 10 KΩ to limit the maximum voltage on the SR_DRAIN node 126a to no more than about 21.5V in some embodiments.

In some embodiments, the internal resistive element 146, shown schematically as a variable resistance in FIG. 1A, has a resistance value set by the manufacturer at the time the flyback converter 100 is manufactured based on either desired input or output voltages, or to compensate for variations in parameters of the IC or other components in the flyback converter 100. Alternatively, the resistance value of the internal resistive element 146 can be dynamically adjusted by a calibration circuit in the flyback converter 100 or secondary side controller 102, either at start-up or powering on of the flyback converter, or periodically thereafter.

Optionally, as in the embodiment shown, the voltage divider 130 further includes a switching element or switch 150 in parallel to the internal rectifier 148. The switch 150 is closed during feedforward (ff) sensing in response to an ff-signal (ff_enable) generated in the secondary side controller 102 upon detection of an increasing or non-zero positive voltage on the drain SR_DRAIN 126a, which indicates a feedforward operation. Although the internal rectifier 148 and the switch 150 are shown schematically as two separate and distinct elements, this need not always be the case. In at least some embodiments, the internal rectifier 148 and the switch 150 are alternatively included a single device, such as a FET, in which the switch 150 is formed by the FET and the internal rectifier 148 is formed by an intrinsic body diode between a source and drain of the FET.

In at least some embodiments, with reference to FIG. 1A, the flyback converter 100 further includes an isolation circuit or barrier 152 to electrically isolate the secondary side 108 from the high AC input voltage present on the primary side 106. Because the transformer 104 is a step down transformer it is generally considered part of the isolation barrier 152. Additionally where, as illustrated, the converter 100 is a flyback converter in which a signal 154 is provided to the primary side controller 118 from pins on the secondary side controller 102, such as a feedback pin 156 or pulse width modulation (PWM) drive pin 158. The isolation barrier 152 can further include additional circuits or elements between the secondary side controller 102 and the primary side controller 118 or PS 116. The isolation barrier 152 can include an opto-isolator or a pulse transformer, for example. In other embodiments, the isolation barrier 152 can be implemented that may or may not include all elements and components shown in these figures.

Referring to FIG. 1B, according to some embodiments, as in secondary side controller 102 and SR sense block 164 shown in FIG. 1A, the secondary side controller 102 further includes a PWM circuit 160 and a feedback (FB) circuit 162 from which a PWM_DRV signal and a feedback (FB) signal are provided, respectively, and coupled through the isolation barrier 152 to the primary side controller 118, all integrally formed on a single IC with other components and elements of the secondary side controller 102.

In various embodiments, the SR sense block 164 includes a zero-crossing detector (ZCD) block 166, a negative signal (NSN) block 168, a peak detector (PKD) block 170, and a line feedforward (LFF) block 172. The ZCD block 166 (e.g., ZCD circuit) can include a comparator having a first, inverting input coupled through the SR-Vss pin 134 to the source node 126c of the SR_FET 126, and a second, non-inverting input coupled to the SR sense pin 128 and through the voltage divider 130 to the SR_DRAIN node 126a of the SR. During the ZCD detection phase, where the SR_DRAIN node 126a is at negative voltages and ramping towards 0V, the internal rectifier 148 is kept enabled without enabling the switch 150 to allow no voltage division in voltage divider 130. This enables direct voltage of SR_DRAIN node 126a at the non-inverting input of the ZCD comparator. The comparator of the ZCD block 166 can be configured to generate a zero current signal (ZCD_OUT) to turn off the SR_FET 126 when zero voltage is sensed on the SR sense pin 128 and the SR_DRAIN node 126a without any voltage division. No voltage division enables precise detection of zero-current or voltage crossing of the SR_DRAIN node 126a, improving efficiency of the flyback converter 100.

The NSN block 168 can also include a comparator having a first, inverting input coupled to the SR sense pin 128 and through the voltage divider 130 to the SR_DRAIN node 126a of the SR_FET 126, and a second, non-inverting input coupled to a negative reference voltage (Vtnesn) which can be anywhere from −700 mV to +200 mV. This reference voltage, Vtnesn, can be defined to desired negative voltage trip point at which the controller needs to turn-on the SR_GDRV, which is coupled to the gate node 126b. An alternate method for negative reference voltage could be, for example, connecting non-inverting input coupled through the SR-Vss pin 134 to the source node 126c of the SR_FET 126 and the comparator can have an in-built offset to trip when the SR sense pin 128 is at the negative reference voltage. During the NSN detection phase, where the SR_DRAIN node 126a is going from positive to negative voltages, the internal rectifier 148 can be kept enabled without enabling the switch 150 to allow no voltage division in voltage divider 130. This enables direct voltage of SR_DRAIN node 126a at the inverting input (e.g., from the SR sense pin 128) of the NSN comparator. The NSN comparator generates a negative voltage signal (NSN_OUT) to turn-on the SR_FET 126.

During power delivery on the secondary side, when the SR_FET 126 turns-off, and as PS 116 has not yet turned-on, it results in LC sinusoidal oscillations on the SR_DRAIN node 126a as well as inverted sinusoidal on the primary terminal 104b of the flyback transformer 104. To improve AC-DC converter efficiency, the power switch 116 is turned on when there is a valley in these sinusoidal oscillations, which corresponds to a peak on the secondary SR_DRAIN node 126a. The PKD block 170 is the peak sensing block on the secondary side 108. The PKD block 170 can also include a comparator having a first, inverting input coupled to the SR sense pin 128 through a switch 175 and an internal capacitor 174, and through the voltage divider 130, and a second, non-inverting input coupled to ground. Generally, as in the embodiment shown the PKD block 170 further includes a back-to-back connected diode circuit 176 across the first and second inputs to the comparator to detect the peak of the sinusoidal waveform seen on SR sense 128. The comparator is configured to generate a peak voltage detection signal (PKD_OUT), which can be coupled to the primary side controller 118 to turn on the PS 116 to enable a valley switching mode of operation. The switch 175 is kept off during NSN and ZCD detection phase to avoid a capacitive load offered by the PKD block on the SR sense pin 128, thus reducing any delay in sensing a negative sense mode (NSN) of operation and/or zero crossing detection (ZCD), thereby improving performance and efficiency of the flyback converter 100. The switch 175 is turned-on during peak-detection function, by using a derived signal form ZCD_OUT, as ZCD_OUT determines turning-off of SR FET 126, after which LC sinusoidal oscillation can occur.

Finally, AC Line-Feed-Forward (LFF) block 172 can include a voltage-to-current (V2I) block, which is coupled through a switch 178, a sample and hold circuit using diode element 180 along with charge-storage element (capacitor 182) to the SR sense pin 128 and through the voltage divider 130 to the SR_DRAIN node 126a of the SR_FET 126. During the phase when the power switch 116 is turned on, the difference between the fourth terminal 104d and the third terminal 104c of the flyback transformer 100 develops a proportional reflected voltage of line-in rectified voltage on the first terminal 104a of the transformer 104, in accordance to turns-ratio (N) of flyback transformer 104. As the fourth terminal 104d is also coupled to the SR_DRAIN node 126a, which is used as a sensing node inside the secondary side-controller 102 after a resistor divider 130, the SR sense pin 128 node also carries the line-in voltage information which is derived using LFF block 172. The line-in information can be used by the secondary side controller 102 to alter the valley switching or PWM pulse-width to optimize the efficiency of the flyback converter 100 across variable AC line-in.

In various embodiments, the phase where the power switch 116 is turned-on and the SR_DRAIN node 126a gets reflected proportional voltage, is defined as feed-forward sensing phase and during this phase, switch 178 is turned-on to start sensing line-in voltage via the SR sense 128 pin. At the same time, switch 150 is also turned on to bypass the internal rectifier 148 to allow exact resistive divided version of SR_DRAIN node 126a to reach at the input of LFF block 172. The switch 178 is kept off during NSN and ZCD detection phases to avoid capacitive load offered by LFF block on SR sense pin 128 node, which helps to reduce the delay in sensing NSN and ZCD and improves performance and efficiency of the flyback converter 100. The LFF block 172 is configured to generate a current signal (IFF_OUT) when the flyback converter 100 is operating in a feed-forward sensing mode. This IFF_OUT current then can be used to modulate PWM pulse-width as per line AC voltage, which improves performance and efficiency of the AC-DC converter over a wide-range of AC input voltage range. The IFF_OUT current can also be converted to voltage which would be proportional to line AC input voltage and can be used for any function required on the secondary side controller 102, like for altering a valley at which the PS 116 is turned-on based on line AC voltage for the same output power requirement, to improve performance of the flyback converter 100.

In accordance with some embodiments, the secondary side controller 102 further includes a calibration block 184 including logic circuits 186 (e.g., control logic) and instructions stored in memory 188. The calibration block 184 can be configured to perform a calibration to measure a loop turn-around delay (Tloop) and set timing for a signal to turn on the PS 116 in response to the voltage sensed on the SR_DRAIN node 126a of the SR_FET 126. Since a valley on the primary side occurs following turning on the PS 116 and causes the voltage sensed on the SR_DRAIN node 126a of the SR_FET 126 to go up, Tloop can be measured in the calibration block 184 by measuring a delay from a time when a signal is sent to turn-on the PS until a time when the voltage sensed on the SR_DRAIN node 126a of the SR_FET 126 goes up as indicated by detection of a zero-crossing by the ZCD block 166 in CCM mode. Tloop is shown, for example, between time t5 and t1 in FIG. 3, FIG. 4, and FIG. 5. Post calibration, instructions such as firmware stored in the memory 188 can be executed to calculate a precise timing for subsequent signals to turn on the PS 116 with reference to a zero-crossing by the ZCD block 166, thereby ensuring the PS is turned on at or near a valley on the primary side and improving efficiency of the flyback converter 100.

Generally, in at least some embodiments, the calibration block 184 accurately determines or detects valleys on the primary side 106 with reference to a zero voltage crossing. The timing for a first valley (1$^{st}$ Valley) following calibration is as shown in the formula below:

$$1^{st}\text{ Valley}=Tzpk-Tloop$$

where Tzpk is the time from when a zero crossing is first sensed following calibration to a time when a first peak voltage is sensed on the SR_DRAIN node 126a of the SR_FET 126 following the calibration cycle. Tzpk is shown, for example, between time t2 and t3 in FIG. 5.

The timing for a subsequent valley (N$^{th}$ Valley) following the first valley is as shown in the formula below:

$$N^{th}\text{ Valley}=Tzpk-Tloop+(N-1)Tpkpk$$

where N is an integer of 2 or more, and Tpkpk is the time between when two successive peak voltages are sensed on the SR_DRAIN node 126a of the SR_FET 126. An example of Tpkpk is shown, for example, between time t3 and t4 in FIG. 5.

It will be understood from the above that the calibration cycle further includes determining the values of Tzpk and Tpkpk. In one embodiment, the calibration block 184 can measure Tzpk directly by measuring a time from when a zero crossing is sensed on the SR_DRAIN node 126a of the SR_FET 126 using the ZCD block 166 until a time when a peak voltage is first sensed by the PKD block 170. Similarly, the calibration block 184 can measure Tpkpk directly by measuring a time between when two successive peak voltages are sensed on the SR_DRAIN node 126a of the SR_FET 126 as sensed by the PKD block 170. Additionally, in some embodiments, the calibration cycle includes repeating the measuring of Tpkpk multiple iterations to obtain an average value of the time (Tpkpk$_{avg}$) between two successive peak voltages, thereby further improving the accuracy of valley detection in the primary side 106 and the efficiency with which the flyback converter is operated.

In an alternative embodiment, because the inductor-capacitor (LC) or valley ringing on the primary side following powering on the flyback converter depends on external components having fixed values, i.e., an inductance of the primary side (Lprim) and capacitance of a drain node of a primary FET or PS 116, the time between the first zero-crossing and the first peak voltage (Tzpk), and the time between two successive peak voltages (Tpkpk) can be calculated or measured for a particular application or flyback converter 100 and stored as a input to memory 188 instead of being measured.

Figure 3:
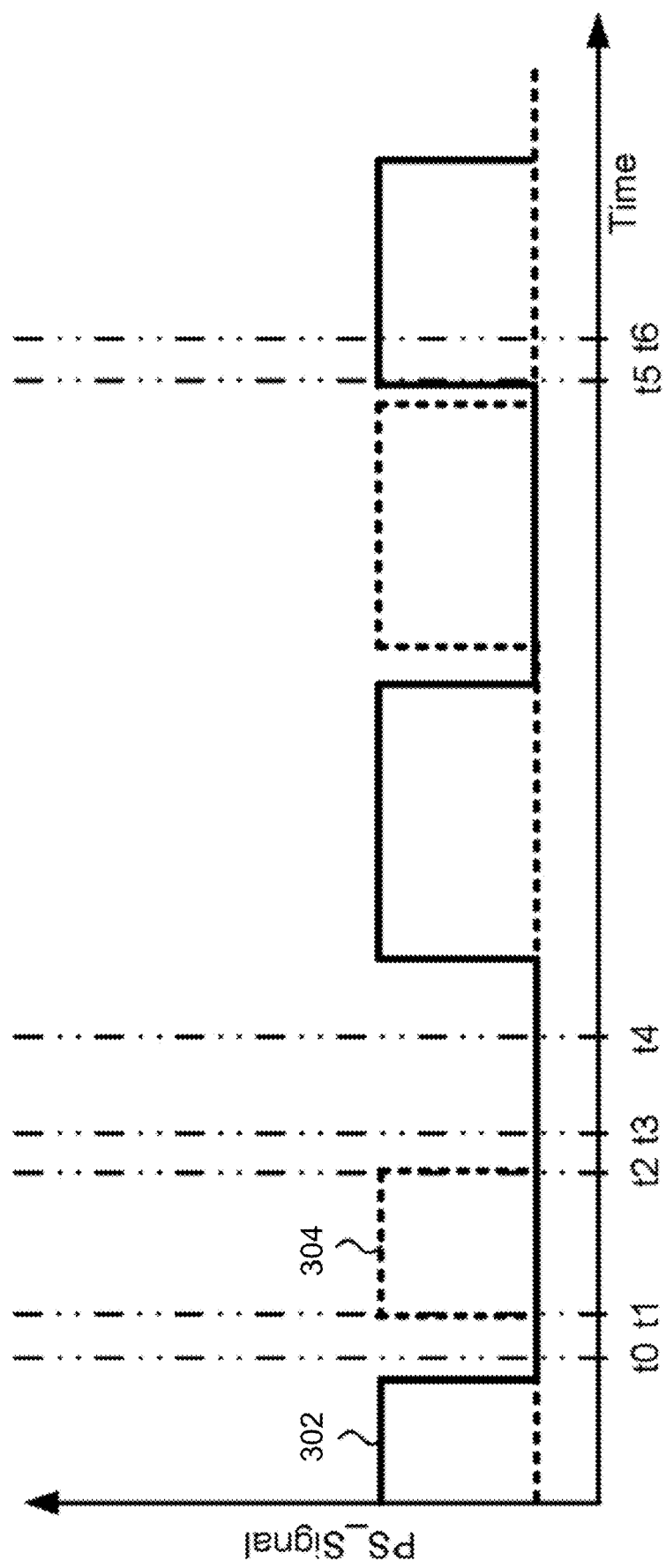
FIG. 3 is a graph showing gate drive signals to a power switch (PS) and a synchronous rectifier (SR) transistor over time in the circuit of FIG. 1A and FIG. 1B as operated by the method of FIG. 2 according to an embodiment.
Figure 4:
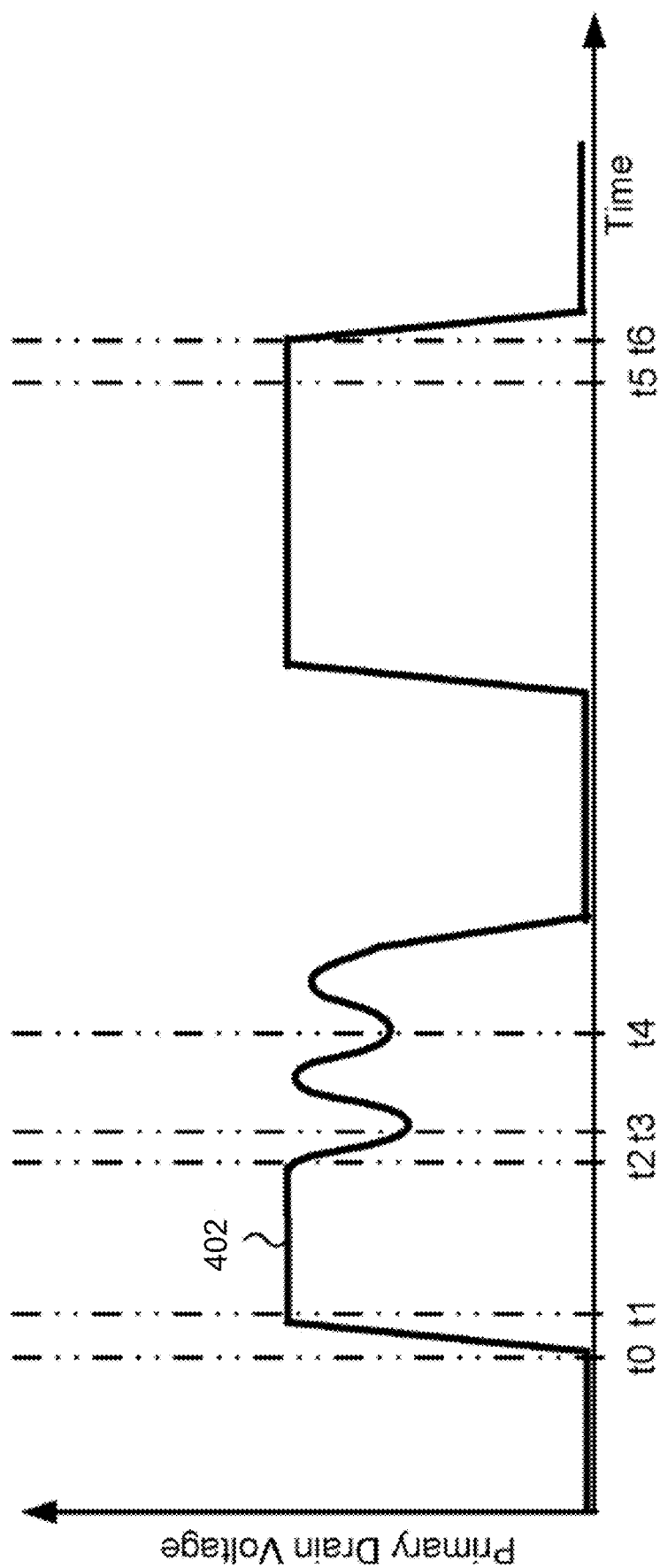
FIG. 4 is a graph showing voltage on a drain node of the PS over time as controlled by the circuit of FIG. 1A and FIG. 1B and operated by method of FIG. 2 according to an embodiment.
Figure 5:
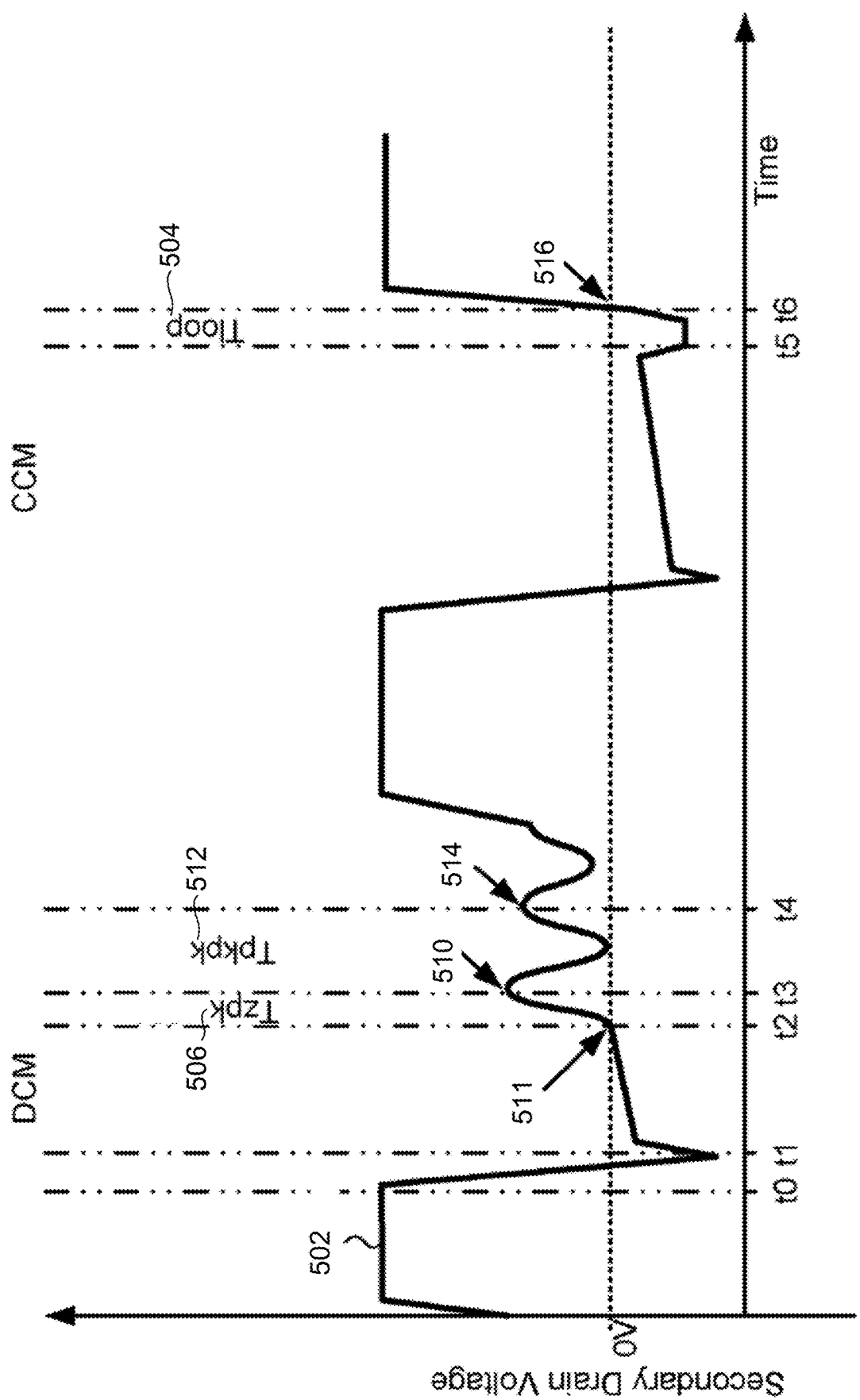
FIG. 5 is a graph showing voltage on a drain node of a SR transistor over time as sensed by the circuit of FIG. 1A and FIG. 1B and operated by the method of FIG. 2.

A method for operating a flyback converter including a secondary side controller will now be described with reference to the flowchart of FIG. 2 and FIG. 3 through FIG. 5. FIG. 3 is a graph showing a gate drive signal 302 to a primary FET or PS 116 and a gate drive signal 304 to a SR_FET 116 in the circuit of FIG. 1A as operated by the method of FIG. 2. FIG. 4 is a graph showing the resulting primary drain voltage 402 on a drain node of the PS 116 over time, and FIG. 5 shows the secondary drain voltage 502 on a drain node of the SR_FET 126 as sensed by the circuit of FIG. 1 and operated by the method of FIG. 2.

Figure 2:
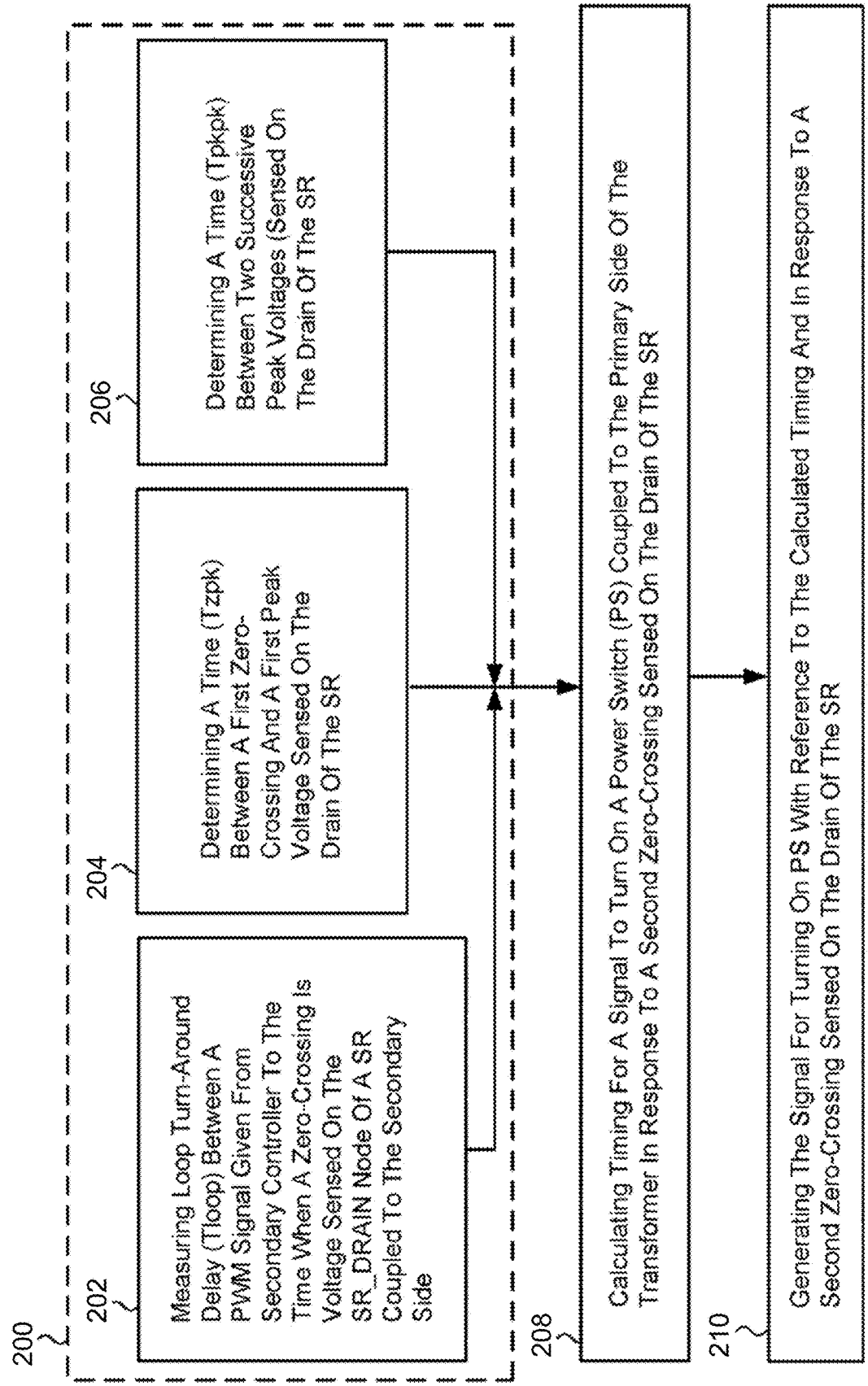
FIG. 2 is a flowchart illustrating a control method for the flyback converter of FIG. 1A and FIG. 1B in accordance with an embodiment.

FIG. 2 is a flowchart illustrating a control method for the flyback converter of FIG. 1A and FIG. 1B in accordance with an embodiment. Referring to FIG. 2, after powering up the flyback converter 100, the method begins with performing a calibration cycle 200. Generally, the calibration cycle 200 involves at least three operations, which can be performed simultaneously or sequentially in any order. The three operations of the calibration cycle include a first operation 202 of measuring loop turn-around delay (Tloop 504) between a PWM signal given from the secondary side controller 102 to the time when zero-crossing (ZCD) voltage sensed on the SR_DRAIN node 126a of a SR_FET 126 coupled to the secondary side 108. Due to SR_DRAIN node 126a going high because of the PS 116 turning on in the primary side 106, for example, when the secondary side controller 102 sends a gate drive signal (302 in FIG. 3) at time t5 it causes the resulting primary drain voltage (402 in FIG. 4) to go down at time t6, which is detected as a zero-crossing (ZCD 516 in FIG. 5) at time t6 while the flyback converter 100 is operating in a continuous conduction mode (CCM) mode.

The three operations of the calibration cycle further includes a second operation 204 of determining a time (Tzpk 506) between a first zero-crossing (ZCD 511 in FIG. 5) and a first peak voltage (510 in FIG. 5) sensed on the drain of the SR_FET 126. Finally, a third operation 206 of the three operation calibration cycle includes determining a time (Tpkpk 512 in FIG. 5) between two successive peak voltages (for example 510 and 514 in FIG. 5) sensed on the drain of the SR_FET 126.

Referring again to FIG. 2, after the calibration cycle the timing for the signal to turn on the PS is calculated based on Tloop, Tzpk and Tpkpk (operation 208), and the signal generated in relation to a most recently sensed zero crossing on the drain node of the SR_FET 126 (operation 210) in order to turn-on the primary FET (PS 116) at or very close to the desired number of valley which helps to improve efficiency and performance of the AC-DC flyback converter.

Referring to FIG. 5, since turning on the PS 116 (primary FET) causes a voltage at the SR_DRAIN node 126a to go up, the loop turn-around delay (Tloop) 504 can be measured by hardware in the secondary side controller in operation 204 by measuring a delay from a time (t5) when the secondary controller sends a gate drive signal (e.g., at the primary drain voltage 402 in FIG. 4) turning on the PS 116 until a time (t6) when the SR_DRAIN node 126a crosses zero (ZCD 516 in FIG. 5) while the flyback converter is operating in a continuous conduction mode (CCM) mode.

Similarly, the time (Tzpk 506) between the first zero-crossing (ZCD 511 in FIG. 5) at time (t2) and the first peak voltage 510 sensed on the SR_DRAIN node 126a at time (t3) can be measured in operation 204 by hardware in the secondary side controller 102, and the time (Tpkpk 512) between two successive peak voltages 510 and 514 from time (t3) to time (t4) can measured in operation 206. Additionally, in some embodiments, the calibration cycle 200 includes repeating operation 206 a number of times to measure multiple peak-to-peak delays to obtain an average value of the time (Tpkpk) between two successive peak voltages, thereby further improving the accuracy of valley detection in the primary side 106 and the efficiency with which the flyback converter is operated.

In an alternative embodiment, the time between the first zero-crossing and the first peak voltage (Tzpk), and the time between two successive peak voltages (Tpkpk) because the inductor-capacitor (LC) or valley ringing on the primary side following powering on the flyback converter depends on external components having fixed values, i.e., an inductance of the primary side (Lprim) and capacitance of a drain node of a primary FET or PS 116, the Tpkpk and Tzpk can be calculated or measured for a particular application/ converter and given as a input to the memory, such as firmware of the secondary side controller, instead of being measured by hardware in the secondary side controller.

In at least some embodiments, as was discussed, the primary FET or PS 116 should be turned on at a peak at the SR_DRAIN node 126a of the SR_FET 126 for minimizing switching loss and thus to achieve optimal efficiency. High frequency converters using low primary inductance of the transformer 104 and low primary switch capacitance (e.g., Coss) have sinusoidal ringing frequencies in the range of 2-10 MHz. High speed accurate peak detection on the secondary side 108 should be sought for achieving optimal efficiency in such cases. Otherwise, losses are introduced on the primary side when turning on the PS 116 late. Accordingly, an enhancement to the peak detector (PKD) block 170 to achieve 6-10 MHz additional bandwidth of operation.

Furthermore, the sensing delay and path delay from the secondary peak-detection to PS 116 turning-on results in missing the peak by a significant amount for frequencies greater than 3 MHz, resulting in potentially significant efficiency loss. In other words, high-frequency causes delay from secondary peak detection to the PS 116 turning on. Additionally, for accurate zero voltage sensing (ZVS) switching, accurate valley sensing should be achieved at the SR_FET 126 to reduce power loss in the SR_FET 126. A high-speed, current-based sensing architecture illustrated and discussed with reference to FIGS. 6-9 to detect high frequency peaks and valleys at the SR_DRAIN node 126a on the secondary side 108 of the flyback converter 100.

Figure 6:
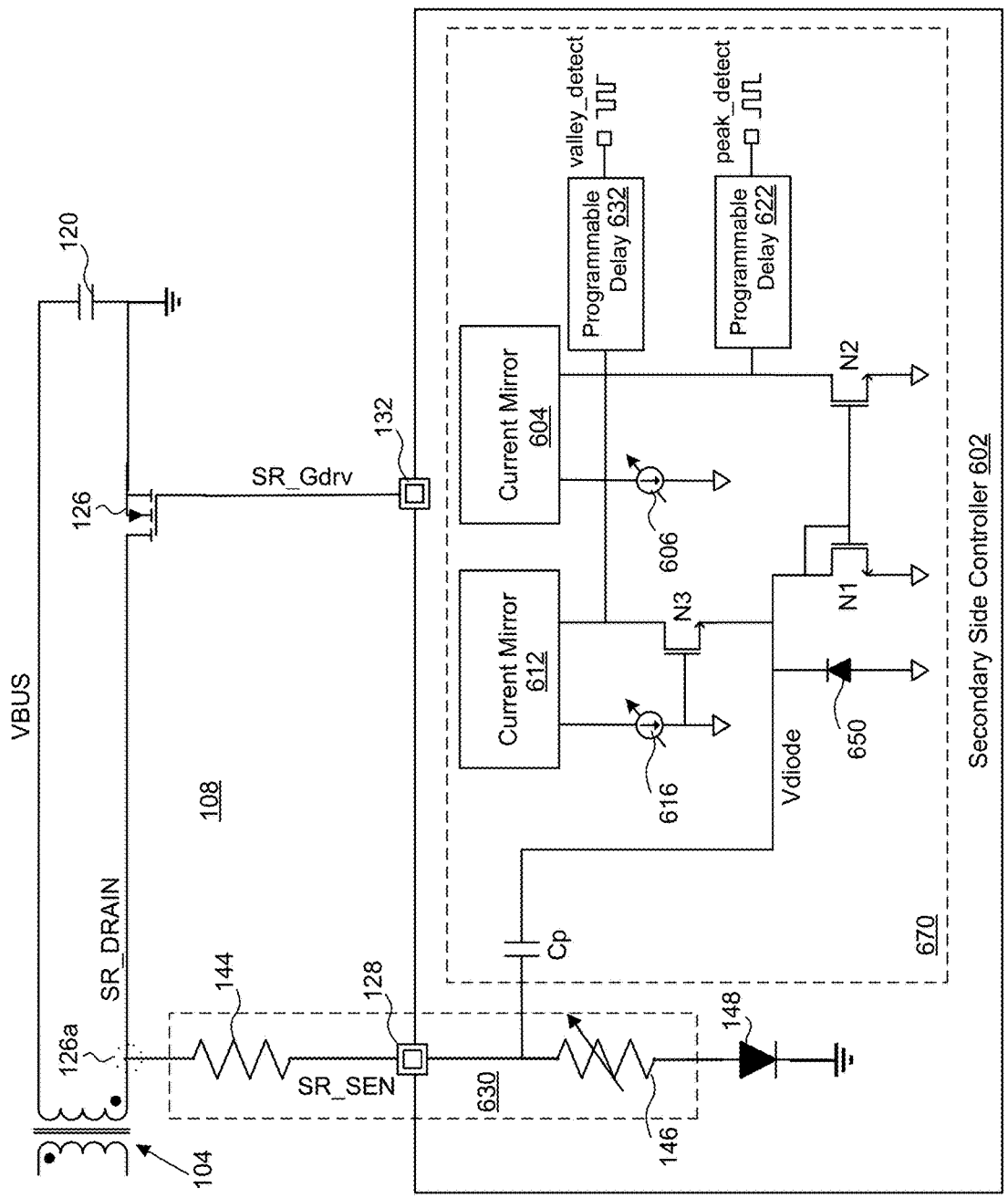
FIG. 6 is a schematic block diagram depicting a secondary side controller according to at least some embodiments.

FIG. 6 is a schematic block diagram depicting a secondary side controller 602 according to at least some embodiments. The secondary side controller 602, for example, includes a peak and valley detector block 670, e.g., instead of the PKD block 170 (FIG. 1B). In these embodiments, the secondary side controller 602 is an IC, as was discussed with reference to the secondary side controller 102 (FIGS. 1A-1B). This secondary side controller 602 includes the synchronous rectifier (SR) sense pin 128 (e.g., the SR_SEN pin) coupled to a drain of an SR transistor (e.g., the SR_FET 126) on the secondary side 108 of the flyback converter 100. In at least some embodiments, the secondary side converter 602 is configured to control the flyback converter 100 to provide a direct-current (DC) output compatible with a universal serial bus type C standard (USB-C), as discussed in further detail herein with reference to FIGS. 1A-5.

In these embodiments, the secondary side controller 602 includes a variable resistor (e.g., the internal resistive component 146) coupled to the SR sense pin 128, where the variable resistor is part of a voltage divider 630 coupled between the drain of the SR transistor (e.g., the SR_FET 126) and the SR sense pin 128. The secondary side controller 602 further includes a diode (e.g., the internal rectifier 148) coupled between the variable resistor and the ground, e.g., with the cathode coupled to the ground. In some embodiments, the voltage divider 630 is at least part of the voltage divider 130 discussed previously with reference to FIGS. 1A-1B.

Further, in at least some embodiments, the peak and valley detector block 670 includes a capacitor Cp having a first side coupled to the SR sense pin 128, the capacitor Cp to charge or discharge responsive to a voltage sensed at the SR sense pin 128. A diode-connected transistor N1 is coupled between a second side of the capacitor Cp and ground, e.g., GND. In these embodiments, a first current mirror 604 is coupled to the diode-connected transistor N1 and configured to receive, as input current, a reference current from a variable current source 606. In some embodiments, a peak detect transistor N2 has a gate coupled to a gate of the diode-connected transistor N1 and to an output of the first current mirror 604, where the peak detect transistor N2 is to output a peak detection signal in response to detecting current from the capacitor Cp drop below the reference current.

Figure 7:
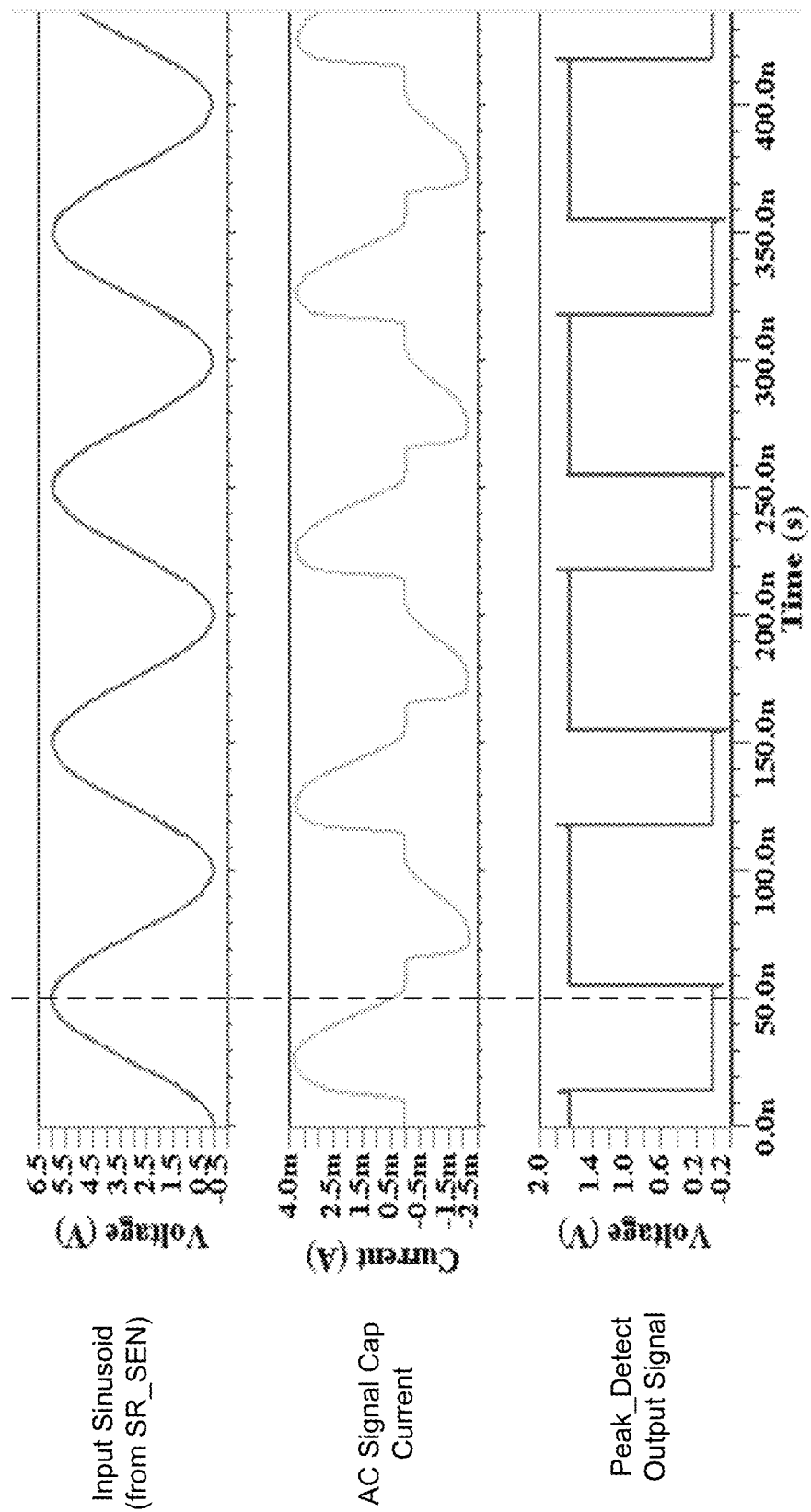
FIG. 7 is a graph illustrating multiple waveforms, including an input sinusoid, an AC signal capacitor current, and a peak detector output of the secondary side controller of FIG. 1 according to at least one embodiment.

Accordingly, the AC signal current injected by the input sinusoid (see FIG. 7) through the capacitor Cp is mirrored by N2 and compared with the first current mirror 604 that is supplied with the reference current coming from a programmable IDAC of the variable current source 606. This AC current signal from the capacitor Cp can go to zero and then to a negative current, as illustrated in FIG. 7. When the capacitor Cp current first hits zero, this corresponds to a peak voltage input (Vin). When the input sinusoid reaches its peak, the change in voltage versus time across the Cp is reduced and the signal current decreases below the reference current, resulting in the peak-detect signal going high, illustrated as the peak_detect output signal in FIG. 7.

In some embodiments, the variable current source 606 is a current digital-to-analog converter (IDAC) programmed to generate the reference current such that the peak detect transistor N2 triggers the output at or before an actual peak of the voltage sensed at the SR sense pin 128. Thus, in some embodiments, the current reference is programed at a lower current (or Iref) value so that the peak is detected somewhat sooner than the actual peak, e.g., shifting the peak detection output signal of FIG. 7 slightly to the left. This is one way for compensating for detection and/or path delay in the flyback converter 100, and facilitating heightened switching efficiency.

As was discussed with reference to FIGS. 1A-1B, the PWM drive pin 158 can be configured to drive the power switch (PS) 116 in a the primary side 106 of the flyback converter 100. Further, control logic 186 of the calibration block 184 can be coupled to the peak detect transistor N2, similar to the PKD out signal of the comparator from the PKD block 170 being coupled to the calibration block 184 in FIG. 1B. Thus, the peak and valley detector block 670 can be understood as an optional replacement to the PKD block 170. In these embodiments, the control logic 186 is configured to send a turn-on signal to the PS 116 via the PWM drive pin 158 in response to the output peak detection signal of the peak detect transistor N2.

In various embodiments, as was discussed with reference to FIG. 1A, the ZCD block 166 is configured to detect a zero crossing of the voltage sensed at the SR sense pin 128. The peak and valley detector block 670 can further include a delay circuit 622 that is programmable and is coupled to an output of the peak detect transistor N2. For example, the delay circuit 622 can be programmed to a provide a total delay including: i) the loop turn-around delay (Tloop) determined as a time from when the turn-on signal is sent to the PS 116 to a time when the voltage sensed at the SR sense pin 128 crosses zero; and ii) peak-to-peak delay (Tpkpk) determined as a time between peaks of the voltage sensed at the SR sense pin 128 by the peak detect transistor N2. Further, to detect a first peak after start-up, an initial total delay can include an estimated loop turn-around delay (e.g., that is pre-programmed as an expected initial Tloop delay) and a zero crossing-to-peak delay determined as a time from when the voltage sensed at the SR sense pin 128 crosses zero to a first peak detected by the peak detect transistor N2. These are additional ways for compensating for the detect and path delays, particularly for frequencies higher than 3 MHz.

According to at least some embodiments, the peak and valley detector block 670 further includes a diode 650 coupled between the capacitor Cp and the ground, e.g., where a cathode of the diode 650 is coupled to the second side of the capacitor Cp and an anode of the diode 650 coupled to the ground. The peak and valley detector block 670 further includes a second current mirror 612 that receives, as input current, a second reference current from a second variable current source 616. The peak and valley detector block 670 further includes a valley detect transistor N3 having a gate coupled to ground, a source coupled to the diode-connected transistor, and a drain coupled to an output of the current mirror 612, where the drain of the valley detect transistor N3 transitions to a low voltage in response to a voltage at the diode 650 (e.g., Vdiode) swinging towards a negative voltage and transitions to a high voltage in response to the voltage at the diode swinging back toward a positive voltage.

Thus, when the AC signal swings low, the other end of capacitor Cp (at Vdiode) swings towards negative 0.7V (e.g., −0.7V). The VGS of the NMOS that is the valley detect transistor N3 is high enough to sink the current and pulldown the valley_detect output signal. When the AC signal swings high after this valley, the Vdiode node goes up. As the VGS of NMOS (N3) is reduced, the signal current is reduced as well across N3 and the valley detect goes high.

In at least some embodiments, the peak and valley detector block 670 further includes a second delay circuit 632 that is programmable and is coupled to an output of the valley detect transistor N3. For example, the second delay circuit 632 can be programmed to a provide a total delay including: i) the loop turn-around delay (Tloop) determined as a time from when the turn-on signal is sent to the PS 116 to a time when the voltage sensed at the SR sense pin 128 crosses zero; and ii) peak-to-peak delay (Tpkpk) determined as a time between peaks of the voltage sensed at the SR sense pin 128 by the peak detect transistor N2. Further, to detect a first valley after start-up, an initial total delay can include an estimated loop turn-around delay (e.g., that is pre-programmed as an expected initial Tloop delay) and a zero crossing-to-valley delay determined as a time from when the voltage sensed at the SR sense pin 128 crosses zero to a first valley detected by the peak detect transistor N2. These are additional ways for compensating for the detect and path delays, particularly for frequencies higher than 3 MHz.

Figure 8:
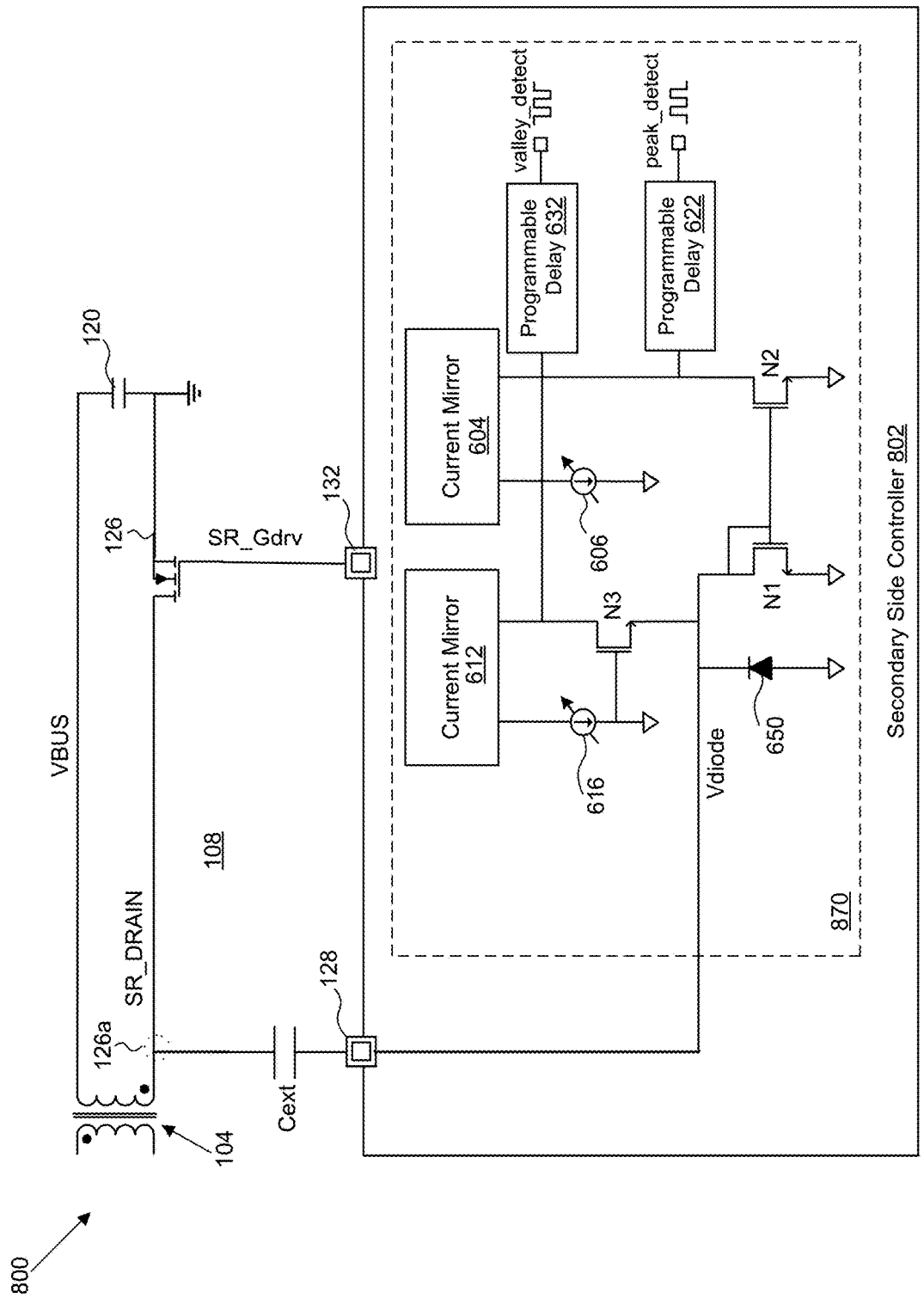
FIG. 8 is a schematic block diagram depicting a flyback converter system according to at least one embodiment.

FIG. 8 is a schematic block diagram depicting a flyback converter system 800 according to at least one embodiment. In this embodiment, the flyback converter system 800 is similar to the flyback converter 100 and the secondary side controller 602. In this embodiment, however, a slightly altered controller (e.g., a secondary side controller 802) is instead employed that does not employ the voltage divider 130 or the internal capacitor Cp. Instead, an external capacitor Cext is employed between the SR_DRAIN node 126A of the SR_FET 126 and the SR sense pin 128. The external capacitor Cext is coupled to the SR transistor (SR_FET 126), the capacitor Cext to charge or discharge responsive to voltage received from the secondary side 108 of the transformer 104. The secondary side controller 802 now instead employs a peak and valley detector block 870, which does not include the internal capacitor Cp, but is coupled to the external capacitor Cext. This alternative embodiment may be employed for even higher frequency applications, e.g., generally at or higher than 5 MHz, and/or which is suitable for gallium-nitride (GaN)-based FET AD-DC converters. Further, according to this alternative embodiment, the capacitance of the external capacitor Cext can be significantly greater than that of the internal capacitor Cp, e.g., anywhere from 6-12 times greater capacitance.

In at least some embodiments, the flyback converter system 800 includes the output capacitor 120 coupled to a source of the SR transistor (e.g., the SR_FET 126). In these embodiments, the output capacitor 120 provides a direct-current (DC) output compatible with a Universal Serial Bus Type C standard (USB-C).

Advantages of the secondary side controller 802 and the flyback converter system 800 further include, in addition to the improved efficiencies already mentioned, high-frequency operation of up to, e.g., 5-10 MHz, peaks can be detected within 50 mV from the actual peak, resulting in accuracy of valley detection on the primary side 106. Further, peaks can be detected prior to the actual peak event and can compensate for peak sensing and path delays, which were discussed herein in detail. The advantages may further include employing the technique of using a previous peak to precisely hit an Nth peak using programmable delay. In embodiments, the flyback converter system 800 does not accumulate error over multiple peaks as compared to using only digital peak using peak-to-peak delay. Further, high-frequency valleys can be detected accurately, e.g., for use in zero sense voltage detection. Additionally, the present embodiments do not employ a sample and hold circuit, but instead uses the much more efficient current compare and trigger by employing transistors and programmable current sources. Finally, the current embodiments employ low power and low area solutions, with minimum increase of bill of materials (BoM).

Figure 9:
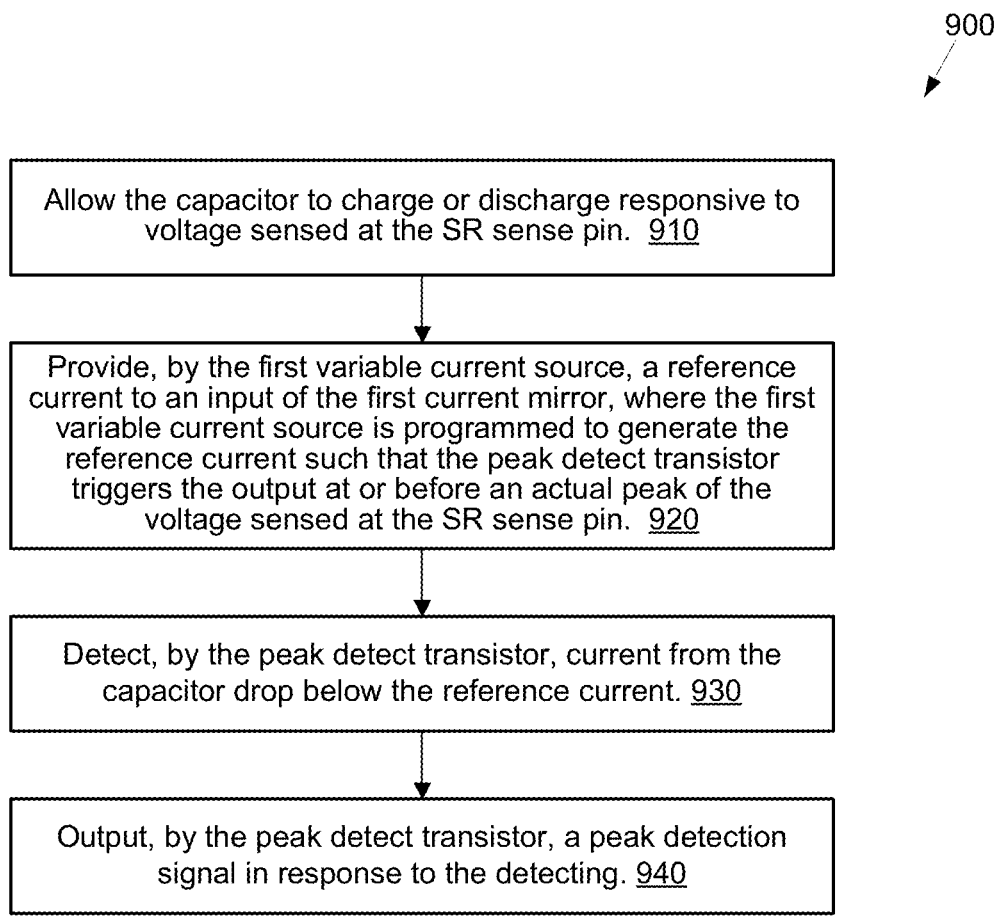
FIG. 9 is a flow diagram of a method of operating a second side controller for a flyback converter according to at least one embodiment.

FIG. 9 is a flow diagram of a method 900 of operating a second side controller for the flyback converter 100 according to at least one embodiment. In these embodiments, the method 900 is performed by the flyback converter 100 that employs the secondary side controller 602, which is illustrated and discussed with reference to FIG. 6, although may generally be applicable to the secondary side controller 802 (FIG. 8) as well, as explained below.

At operation 910, the method 900 includes allowing the capacitor Cp to charge or discharge responsive to voltage sensed at the SR sense pin (or if the external capacitor Cext is used, allowing the capacitor to charge/discharge through the SR_DRAIN node 126*a*).

At operation 920, the method 900 further includes providing, by the first variable current source 606, a reference current to an input of the first current mirror 604, where the first variable current source is programmed to generate the reference current such that the peak detect transistor N2 triggers the output at or before an actual peak of the voltage sensed at the SR sense pin 128.

At operation 930, the method 900 further includes detecting, by the peak detect transistor N2, current from the capacitor drop below the reference current.

At operation 940, the method 900 further includes outputting, by the peak detect transistor N2, a peak detection signal (peak_detect) in response to the detection.

Various embodiments of the AC-DC flyback converter described herein may include various operations. These operations may be performed and/or controlled by hardware components, digital hardware and/or firmware, and/or combinations thereof. As used herein, the term "coupled to" may mean connected directly to or connected indirectly through one or more intervening components. Any of the signals provided over various on-die buses may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for USB-C mode-transition architecture described herein. The non-transitory computer-readable storage medium may include, but is not limited to, electromagnetic storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A secondary side controller for a flyback converter, the secondary side controller comprising an integrated circuit (IC) that comprises:
   a synchronous rectifier (SR) sense pin coupled to a drain of an SR transistor on a secondary side of the flyback converter;
   a capacitor having a first side coupled to the SR sense pin, the capacitor to charge or discharge responsive to a voltage sensed at the SR sense pin;
   a diode-connected transistor coupled between a second side of the capacitor and ground;
   a first current mirror coupled to the diode-connected transistor and configured to receive, as input current, a reference current from a variable current source; and
   a peak detect transistor coupled to the diode-connected transistor and to an output of the first current mirror, wherein the peak detect transistor is to output a peak detection signal in response to detecting current from the capacitor drop below the reference current.

2. The secondary side controller of claim 1, wherein the variable current source comprises a current digital-to-analog converter (IDAC) programmed to generate the reference current such that the peak detect transistor triggers the output at or before an actual peak of the voltage sensed at the SR sense pin.

3. The secondary side controller of claim 1, wherein the IC further comprises:
a variable resistor coupled to the SR sense pin, wherein the variable resistor is part of a voltage divider coupled between the drain of the SR transistor and the SR sense pin; and
a diode coupled between the variable resistor and the ground.

4. The secondary side controller of claim 1, wherein the IC further comprises:
a pulse width modulation (PWM) drive pin configured to drive a power switch (PS) in a primary side of the flyback converter; and
control logic coupled to the peak detect transistor and the PWM drive pin, the control logic to send a turn-on signal to the PS via the PWM drive pin in response to the peak detection signal.

5. The secondary side controller of claim 4, wherein the IC further comprises:
a zero-crossing detector (ZCD) circuit to detect a zero crossing of the voltage sensed at the SR sense pin; and
a delay circuit coupled to an output of the peak detect transistor, the delay circuit programmed to provide a total delay comprising:
a loop turn-around delay determined as a time from when the turn-on signal is sent to the PS to a time when the voltage sensed at the SR sense pin crosses zero; and
peak-to-peak delay determined as a time between peaks of the voltage sensed at the SR sense pin by the peak detect transistor.

6. The secondary side controller of claim 5, wherein, for a first peak after start-up, an initial total delay comprises an estimated loop turn-around delay and a zero crossing-to-peak delay determined as a time from when the voltage sensed at the SR sense pin crosses zero to a first peak detected by the peak detect transistor.

7. The secondary side controller of claim 1, wherein the IC further comprises:
a diode coupled between the capacitor and the ground;
a second current mirror that receives, as input current, a second reference current from a second variable current source; and
a valley detect transistor having a gate coupled to ground, a source coupled to the diode-connected transistor, and a drain coupled to an output of the second current mirror, wherein the drain of the valley detect transistor is to:
transition to a low voltage in response to a voltage at the diode swinging towards a negative voltage; and
transition to a high voltage in response to the voltage at the diode swinging back toward a positive voltage.

8. The secondary side controller of claim 7, wherein the IC further comprises:
a zero-crossing detector (ZCD) circuit to detect a zero crossing of the voltage sensed at the SR sense pin; and
a delay circuit coupled to an output of the valley detect transistor, the delay circuit programmed to provide a total delay comprising:
a loop turn-around delay determined as a time from when a turn-on signal is sent to a power switch (PS) in a primary side of the flyback converter to a time when the voltage sensed at the SR sense pin crosses zero; and
peak-to-peak delay determined as a time between peaks of the voltage sensed at the SR sense pin by the peak detect transistor.

9. The secondary side controller of claim 1, configured to control the flyback converter to provide a direct-current (DC) output compatible with a universal serial bus type C standard (USB-C).

10. A flyback converter system comprising:
a transformer;
a synchronous rectifier (SR) transistor coupled to a secondary side of the transformer;
a capacitor coupled to the SR transistor, the capacitor to charge or discharge responsive to voltage received from the secondary side of the transformer; and
a secondary side controller comprising:
an SR sense pin coupled to the capacitor;
a diode-connected transistor coupled to the SR sense pin;
a first current mirror coupled to the diode-connected transistor and configured to receive, as input current, a reference current from a variable current source; and
a peak detect transistor coupled to the diode-connected transistor and to an output of the first current mirror, wherein the peak detect transistor is to output a peak detection signal in response to detecting current from the capacitor drop below the reference current.

11. The flyback converter system of claim 10, wherein the variable current source comprises a current digital-to-analog converter (IDAC) programmed to generate the reference current such that the peak detect transistor triggers the output at or before an actual peak of the voltage provided by the capacitor.

12. The flyback converter system of claim 10, wherein the secondary side controller further comprises:
a pulse width modulation (PWM) drive pin coupled to a power switch (PS) in a primary side of the flyback converter system; and
control logic coupled to the peak detect transistor and the PWM drive pin, the control logic to send a turn-on signal to the PS via the PWM drive pin in response to the peak detection signal.

13. The flyback converter system of claim 12, wherein the secondary side controller further comprises:
a zero-crossing detector (ZCD) circuit to detect a zero crossing of the voltage provided by the capacitor; and
a delay circuit coupled to an output of the peak detect transistor, the delay circuit programmed to a provide a total delay comprising:
a loop turn-around delay determined as a time from when the turn-on signal is sent to the PS to a time when the voltage sensed at the SR sense pin crosses zero; and
peak-to-peak delay determined as a time between peaks of the voltage of the capacitor detected by the peak detect transistor.

14. The flyback converter system of claim 13, wherein, for a first peak after start-up, an initial total delay comprises an estimated loop turn-around delay and a zero crossing-to-peak delay determined as a time from when the voltage of the capacitor crosses zero to a first peak detected by the peak detect transistor.

15. The flyback converter system of claim 10, wherein the secondary side controller further comprises:
a diode coupled between the capacitor and the ground;
a second current mirror that receives, as input current, a second reference current from a second variable current source; and
a valley detect transistor having a gate coupled to ground, a source coupled to the diode-connected transistor, and a drain coupled to an output of the second current mirror, wherein the drain of the valley detect transistor is to:
    transition to a low voltage in response to a voltage at the diode swinging towards a negative voltage; and
    transition to a high voltage in response to the voltage at the diode swinging back toward a positive voltage.

16. The flyback converter system of claim 15, wherein the secondary side controller further comprises:
    a zero-crossing detector (ZCD) circuit to detect a zero crossing of the voltage sensed at the SR sense pin; and
    a delay circuit coupled to an output of the valley detect transistor, the delay circuit programmed to a provide a total delay comprising:
        a loop turn-around delay determined as a time from when a turn-on signal is sent to a power switch (PS) in a primary side of the flyback converter to a time when the voltage sensed at the SR sense pin crosses zero; and
        peak-to-peak delay determined as a time between peaks of the voltage sensed at the SR sense pin by the peak detect transistor.

17. The flyback converter system of claim 16, wherein, for a first peak after start-up, an initial total delay comprises an estimated loop turn-around delay and a zero crossing-to-peak delay determined as a time from when the voltage sensed at the SR sense pin crosses zero to a first peak detected by the peak detect transistor.

18. The flyback converter system of claim 10, further comprising an output capacitor coupled to a source of the SR transistor, the output capacitor to provide a direct-current (DC) output compatible with a universal serial bus type C standard (USB-C).

19. A method of operating a secondary side controller for a flyback converter that comprises a synchronous rectifier (SR) sense pin coupled to an SR transistor on a secondary side of the flyback converter, a capacitor coupled to the SR sense pin, a diode-connected transistor coupled between the capacitor and ground, a first current mirror, a first variable current source, and a peak detect transistor coupled to the diode-connected transistor and to an output of the first current mirror, wherein the method of operating the secondary side controller comprises:
    allowing the capacitor to charge or discharge responsive to voltage sensed at the SR sense pin;
    providing, by the first variable current source, a reference current to an input of the first current mirror, wherein the first variable current source is programmed to generate the reference current such that the peak detect transistor triggers the output at or before an actual peak of the voltage sensed at the SR sense pin;
    detecting, by the peak detect transistor, current from the capacitor drop below the reference current; and
    outputting, by the peak detect transistor, a peak detection signal in response to the detection.

20. The method of operating the secondary side controller of claim 19, wherein the secondary side controller further comprises a diode coupled between the capacitor and the ground, a second current mirror, a second variable current source, and a valley detect transistor coupled to the diode-connected transistor and to an output of the current mirror, the method of operating the secondary side controller further comprising:
    providing, by the second variable current source, a second reference current to an input of the second current mirror;
    transitioning a drain of the valley detect transistor to a low voltage in response to a voltage at the diode swinging towards a negative voltage; and
    transitioning the drain of the valley detect transistor to a high voltage in response to the voltage at the diode swinging back toward a positive voltage.

\* \* \* \* \*